(12) United States Patent
Macarei et al.

(10) Patent No.: US 12,104,433 B2
(45) Date of Patent: Oct. 1, 2024

(54) METHOD FOR HANDLING SPACER FRAMES

(71) Applicant: LISEC AUSTRIA GMBH, Seitenstetten (AT)

(72) Inventors: Clemens Macarei, Seitenstetten (AT); Walter Heiden, Seitenstetten (AT)

(73) Assignee: LISEC AUSTRIA GMBH, Seitenstetten (AT)

( * ) Notice: Subject to any disclaimer, the term of this patent is extended or adjusted under 35 U.S.C. 154(b) by 362 days.

(21) Appl. No.: 17/628,499

(22) PCT Filed: Jul. 22, 2020

(86) PCT No.: PCT/EP2020/070640
§ 371 (c)(1),
(2) Date: Jan. 19, 2022

(87) PCT Pub. No.: WO2021/013875
PCT Pub. Date: Jan. 28, 2021

(65) Prior Publication Data
US 2022/0268093 A1    Aug. 25, 2022

(30) Foreign Application Priority Data

Jul. 23, 2019    (AT) .............................. A 50663/2019

(51) Int. Cl.
*B32B 41/00*        (2006.01)
*B25J 9/00*         (2006.01)
(Continued)

(52) U.S. Cl.
CPC ......... *E06B 3/67373* (2013.01); *B25J 9/0084* (2013.01); *B25J 9/162* (2013.01);
(Continued)

(58) Field of Classification Search
CPC ............. E06B 3/67373; E06B 3/66342; E06B 3/67317; E06B 3/67321; E06B 3/67365;
(Continued)

(56) References Cited

U.S. PATENT DOCUMENTS

2014/0013893 A1    1/2014   Asano et al.
2018/0355657 A1   12/2018   Hervieux
(Continued)

FOREIGN PATENT DOCUMENTS

CN         103538080 A    1/2014
CN         204124808 U    1/2015
(Continued)

OTHER PUBLICATIONS

Office Action for AT Application No. A 50663/2019 dated Apr. 8, 2020, 2 pages.
(Continued)

*Primary Examiner* — Michael N Orlando
*Assistant Examiner* — Joshel Rivera
(74) *Attorney, Agent, or Firm* — NIXON & VANDERHYE

(57) ABSTRACT

A system that can travel and rotate and is designed in the manner of an at least one-armed robot is used for handling spacer frames in the course of the production of insulating glass. The system grasps a spacer frame with a gripper system provided to rotate at the free end of the robot arm. A spacer frame is moved by the system to stations of a line for producing insulating glass. For example, a spacer frame is held in a station for producing spacer frames, moved to a station for filling the spacer frame, when the spacer frame is to be filled with hygroscopic material, then further moved to a station, in which the lateral surfaces of the spacer frame are coated with sealing and adhesive agents, and finally moved
(Continued)

to a station for assembling insulating glass, in which the spacer frame is mounted on a glass panel.

19 Claims, 1 Drawing Sheet

(51) Int. Cl.
  *B25J 9/16* (2006.01)
  *E06B 3/663* (2006.01)
  *E06B 3/673* (2006.01)
  *B25J 9/04* (2006.01)
  *B25J 15/00* (2006.01)

(52) U.S. Cl.
  CPC ...... *E06B 3/66342* (2013.01); *E06B 3/67317* (2013.01); *E06B 3/67321* (2013.01); *B25J 9/04* (2013.01); *B25J 15/00* (2013.01)

(58) Field of Classification Search
  CPC .. E06B 3/66; B25J 9/0084; B25J 9/162; B25J 9/04; B25J 15/00; B25J 11/00; B29C 63/0026; B65G 49/067
  USPC ............... 156/60, 64, 350, 351, 378, 379
  See application file for complete search history.

(56) References Cited

U.S. PATENT DOCUMENTS

| | | | |
|---|---|---|---|
| 2019/0024441 | A1 | 1/2019 | Vieux |
| 2019/0071921 | A1 | 3/2019 | Donohue |
| 2020/0370361 | A1* | 11/2020 | Zehner ............... E06B 3/67326 |

FOREIGN PATENT DOCUMENTS

| | | |
|---|---|---|
| CN | 108431358 A | 8/2018 |
| DE | 10 2006 026 503 | 1/2008 |
| DE | 20 2007 004 183 | 8/2008 |
| EP | 1 733 909 | 12/2006 |
| EP | 2 796 653 | 10/2014 |
| FR | 2 936 835 | 4/2010 |
| KR | 10-1778537 | 9/2017 |

OTHER PUBLICATIONS

International Search Report for PCT/EP2020/070640 dated Oct. 22, 2020, 5 pages.
Written Opinion of the ISA for PCT/EP2020/070640 dated Oct. 22, 2020, 5 pages.
Office Action issued in Chinese Patent Application No. 202080050022.2 dated Oct. 23, 2023.

* cited by examiner

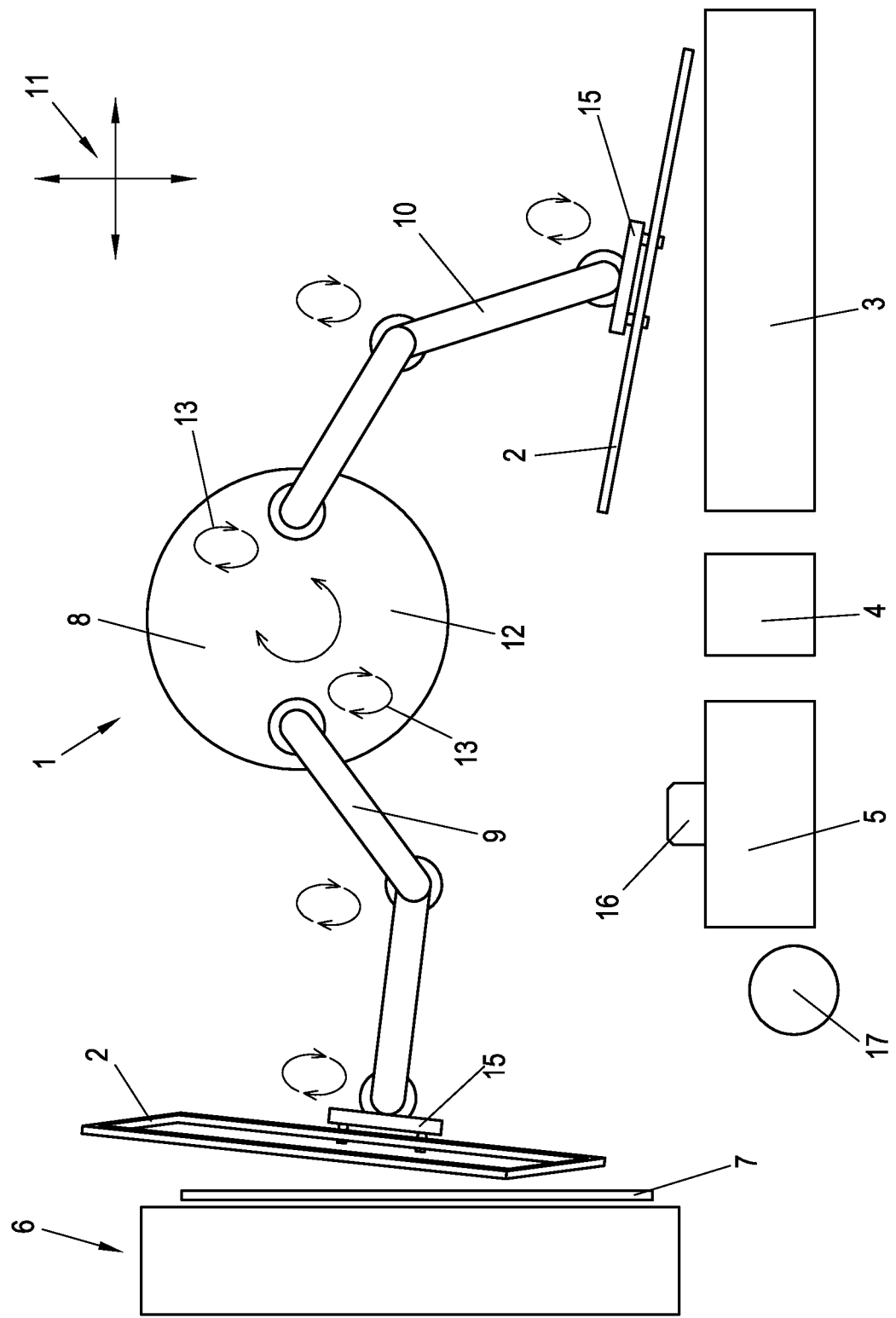

METHOD FOR HANDLING SPACER FRAMES

CROSS-REFERENCE TO RELATED APPLICATIONS

This application is the U.S. national phase of International Application No. PCT/EP2020/070640 filed Jul. 22, 2020 which designated the U.S. and claims priority to Austrian Patent Application No. A 50663/2019 filed Jul. 23, 2019, the entire contents of each of which are hereby incorporated by reference.

BACKGROUND OF THE INVENTION

Field of the Invention

The invention relates to a method for handling spacer frames for insulating glass.

Description of the Related Art

When producing insulating glass, i.e., spacer frames are used, which are composed of sections of hollow-section strips or are formed by bending hollow-section strips.

In the course of the production process for insulating glass, the spacer frames have to be transferred from a station for producing spacer frames and fed to a station for coating spacer frames with an adhesive and sealant material. In addition, the spacer frames that are coated with adhesive material and sealant have to be moved to a station for assembling insulating glass in order to be mounted there on a glass panel.

For moving spacer frames between the individual stations of a facility ("line") for producing insulating glass, various devices are known for when spacer frames are not moved by hand from one station to the next.

The use of robots with grippers for removing sealed insulating glass from a sealing station is known from EP 2 796 653 A1. In this known device, sealed insulating glass panels are removed from the sealing station, moved to a storage device, and deposited there.

DE 10 2006 026 503 B3 discloses a device with a double gripper, which is provided on a robot. Using the double gripper, glass substrate plates can be held and moved to and from a holding station.

A facility for producing insulating glass is known from KR 101778537, in which a robot with a gripper system with two clamps is used in order to mount spacer frames on a glass panel.

It is disadvantageous in the case of devices for handling spacer frames that are known in the state of the art that the latter are laid out onto a special station in a facility for producing insulating glass. It is therefore necessary that for each station of a facility for producing insulating glass, a separate device with a special range of functions assigned thereto is provided.

FR 2 936 835 A1 describes the production of glazed windows or doors (window glass), i.e., complete windows and doors.

A robot is provided that receives glass (with suction devices) from a bearing (bracket) and that is moved to an orienting system, then to a system for preparing (cleaning) the edges of the glass for the application of adhesive, then to a system in which the glass is inserted into a frame. Frames are fed from a stock (not by the robot).

The system in which glass is inserted into a frame comprises two angular faces that are opposite to one another and that can be oriented by rotation.

Another robot carries systems, on the one hand, for preparing the frames for the application of adhesive and, on the other hand, for applying adhesive.

In the case of FR 2 936 835 A1, two different robots are required.

The robots of FR 2 936 835 A1 are not intended for the transport of spacers for insulating glass panels. The frames are fed from the stock "by means not shown" (FR 2 936 835 A1, page 5, lines 10 to 12).

The robots that are shown in FIG. 4 of US 2019/0071921 A1 are multi-axis robots with articulated arms. These robots, however, are mounted on bases and not on rails (cf. also FIGS. 6 and 11) and are assigned to various stations that are not in sequence.

In the case of US 2019/0071921 A1, two robots with various functions are required.

Similar to FR 2 936 835 A1, FR 1 733 909 A1 discloses the production of doors, windows, and the like with inserted insulating glass, but not the production of insulating glass.

In the case of FR 1 733 909 A1, insulating glass is removed with a robot from a bearing bracket, moved to a station in which adhesive is applied, moved to a roller table on which a frame is conveyed, and finally inserted into the frame.

The robot does not move the frame but rather ultimately lifts the finished doors and the like to a bearing bracket.

SUMMARY OF THE INVENTION

The object of the invention is to envision a method of the above-mentioned type, with which the handling of spacer frames for insulating glass is simplified and configured more economically.

Since, in the procedure according to the invention, a system is used that is assigned to various stations in sequence of a facility for producing insulating glass and that can implement the handling of the spacer frame that is necessary for each station, only a single system is necessary during the entire production process for insulating glass.

Within the framework of the invention, it is preferred when a system is used that is designed in the manner of a multi-axis robot (manipulator), wherein it is preferred when the system has two or more than two articulated robot arms that are preferably designed to articulate in many ways.

In order to be able to move the system to the various stations of a facility for producing insulating glass, it is provided in an embodiment of the method according to the invention that a system is used that has a base that is designed to travel, and that the system is moved optionally to stations of a facility (manufacturing line) for insulating glass and/or is moved to one of multiple facilities (manufacturing lines) for insulating glass.

With the method according to the invention, the system can also be used to operate when bending hollow-section strips to form a spacer frame, by having the system hold and guide a hollow-section strip, which is bent to form a spacer frame, in the station for producing spacer frames.

In a similar way, the system according to the invention can be used to move spacer frames in the station for coating spacer frames relative to nozzles, from which an adhesive and sealant material is applied to the spacer frames.

With the method according to the invention, it can also be provided that the system moves a finished spacer frame to a device for filling spacer frames with desiccant, for example granular desiccant in the form of a molecular sieve, when hollow-section strips that are not already pre-filled with desiccant are used, in order to produce spacer frames.

BRIEF DESCRIPTION OF THE SOLE DRAWING

Additional details and features of the method according to the invention follow from the description below of an implementation example with reference to the drawing, in which a facility and a system with which the method according to the invention can be performed are depicted diagrammatically.

DESCRIPTION OF THE PREFERRED EMBODIMENTS

In a facility ("line"), depicted diagrammatically in the drawing, for producing insulating glass, a system 1 is provided, with which spacer frames 2 can be handled in order to move the latter from one station to the next station of the facility for producing insulating glass.

In particular, the facility for producing insulating glass comprises a frame-bending station 3, and, downstream from it, optionally a station 4 for filling spacer frames 2 with desiccant (e.g., molecular sieve), a station 5 for applying adhesive and sealant material to the lateral surfaces of spacer frames 2, and a station for assembling insulating glass, wherein a station 6 is provided, in which spacer frames 2 are mounted on a glass panel 7.

In the embodiment shown, a system 1 that comprises two robot arms 9, 10 on a base 8 that is designed to travel (arrow 11) and to rotate (arrow 12) is assigned to the facility. The robot arms 9, 10 can be pivoted relative to the base 8, as is indicated by the double arrows 13. Each of the robot arms 9, 10 is hinged and has a gripper system 15 that can rotate at its free end relative to the outer robot arm part and that is set up to grasp spacer frames 2. In the embodiment shown, the robot arm 10 is assigned to the station 3 for bending spacer frames 2 and is in this case to remove a spacer frame 2 from the station 3 in order to move the latter to a station 4 for filling spacer frame 2 with desiccant. The station 4 can be omitted when the spacer frame 2 consists of hollow-section strips that are already prefilled with desiccant.

It should be pointed out that, with the method according to the invention, spacer frames 2 can be handled that were produced from a single piece of hollow-section strip or from a hollow-section strip that comprises multiple pieces of hollow-section strips that are connected to one another by bending the hollow-section strip, or spacer frames that consist of pieces of hollow-section strips that are connected to one another via connectors (corner connectors and/or straight connectors) to form a spacer frame 2.

When spacer frames 2 are produced by bending hollow-section strips, the gripper system 15 that is provided on the robot arms 9, 10 can also be used to hold and to guide the hollow-section strip during the bending of the hollow-section strip to form a spacer frame 2, which is advantageous in particular in the case of larger spacer frames 2 in order to avoid undesirable deformations of the hollow-section strip.

A spacer frame 2 removed from the station 3 for producing (e.g., bending) spacer frames 2 is, after it optionally has been filled with desiccant, brought to a station 5 ("butyl machine"), in which sealing agent or adhesive agent (butyl rubber) that exits from nozzles 16 is applied to the lateral surfaces of the spacer frame. In this case, the gripper system 15 of the system 1 is used to move the spacer frames 2 in the area of the nozzles 16 of the station 5 and to rotate each frame leg after coating so that the next frame leg can be coated.

As is usual, a supply container 17 for butyl rubber as an adhesive and sealant material is provided in the station 5.

A spacer frame 2 that is coated with an adhesive and sealant material is then brought by the system 1 to a station 6, in which a spacer frame 2 is mounted on a glass panel 7. A second glass panel is then mounted in an assembly station that is located downstream from the station 6.

When triple-insulating glass or multiple-insulating glass is produced, in each case another spacer frame 2 is mounted on the second or the third, etc. applied glass panel 7 in the station 6.

In the embodiment shown, the system 1 has two robot arms 9, 10, so that one of the robot arms, after it has mounted a spacer frame 2 on a glass panel 7, is free, in order to move again to the station 3 for producing spacer frames 2 and to receive there a new spacer frame 2.

The gripper systems 15 on the free ends of the robot arms 9, 10 can also be used to clamp a spacer frame 2, i.e., to hold it in the correct shape, in particular when the latter is filled in the station 4, butylated in the station 5, and/or mounted on a glass panel 7 in the station 6.

It is not necessary that a system 1 be used in which the gripper systems 15 on the robot arms 9, 10 are designed identically. Rather, for certain applications, differently-designed gripper systems 15 (for example also replaceable) can also be provided.

With the method according to the invention, one or more of the advantages mentioned below of the possible applications can be achieved.

The system 1 that is designed as a multi-functional robot automatically controls the gripping, clamping, turning, butylating, and mounting of a spacer frame. In addition, Means for controlling the extent to which spacer frames 2 are filled with desiccant (weight control), Means for controlling the dimensions of spacer frames 2, and/or Means for controlling the quality of the coating of spacer frames 2 with sealing agents and adhesive agents (butylation) can be assigned to the system 1.

The system 1 that is designed as a multi-functional robot serves as a central control element and operates multiple (manufacturing) stations in the case of insulating glass production.

Since the system 1 takes over the task of handling the spacer frames 2, devices for handling spacer frames 2 are not necessary in the case of the individual stations of a line for producing insulating glass.

The transfer of spacer frames 2 to the next station is also done using the system 1 that is used according to the invention, so that the latter also assumes an (automatic) transport function. This has the advantage that conveying systems that transport the spacer frames 2 between the individual stations can be omitted.

One advantage of the method according to the invention is that a compact design of lines for producing insulating glass is possible, and requirements of equipment of the individual stations are reduced.

An improvement in the utilization of the system in the form of the multi-functional robot is achieved.

In summary, an embodiment of the invention can be described as follows:

A system 1 that can travel and rotate and that is designed in the manner of an at least one-armed robot (manipulator) is used for handling spacer frames 2 in the course of the production of insulating glass. The system 1 grasps a spacer frame 2 with a gripper system 15 that is provided to rotate at the free end of the robot arm 9, 10. A spacer frame 2 is moved by the system 1 to stations of a line for producing insulating glass. For example, a spacer frame 2 is held in a station 3 for producing spacer frames, moved to a station 4 for filling the spacer frame 2, when the spacer frame 2 is to be filled with hygroscopic material, then further moved to a station 5, in which the lateral surfaces of the spacer frame 2 are coated with an adhesive and sealant material, and finally moved to a station 6 for assembling insulating glass, in which the spacer frame 2 is mounted on a glass panel 7.

The invention claimed is:

1. A method for handling spacer frames for insulating glass, wherein a system with a single robot, with which system spacer frames are grasped and moved, is used, wherein the system is assigned in sequence to a station for producing spacer frames, a station for coating spacer frames with adhesive and sealant material, and a station for assembling insulating glass, the method comprising:
    grasping, by the single robot, the spacer frame in the station for producing spacer frames,
    while the single robot holds the spacer frame, coating the spacer frame with the adhesive and sealant material in the station for coating, and
    mounting, by the single robot, the spacer frame, that is coated with the adhesive and sealant material, on a glass panel in the station for assembly,
    wherein the single robot grasps the spacer frame using a gripper system, which gripper system is arranged on at least one robot arm of the single robot, and the single robot moves to plural stations of a single manufacturing line and/or to plural manufacturing lines.

2. The method according to claim 1, wherein the single robot is and operates as a multi-axis robot.

3. The method according to claim 1, wherein the single robot is and operates as a multi-axis robot having two or more articulated robot arms.

4. The method according to claim 1, wherein the single robot has a base that is designed to travel, and wherein the single robot moves to stations of a manufacturing line for insulating glass and/or to one of multiple manufacturing lines for insulating glass.

5. The method according to claim 1, wherein the single robot holds and guides a hollow-section strip, which is bent to form a spacer frame, in the station for producing spacer frames.

6. The method according to claim 1, wherein the single robot moves spacer frames into the station for coating spacer frames relative to nozzles, from which the adhesive and sealant material is applied to spacer frames.

7. The method according to claim 1, wherein the gripper system of the single robot holds spacer frames with clamps, and wherein at least one clamp of the gripper system is placed on each leg of the spacer frame.

8. The method according to claim 7, wherein the spacer frame is held by the gripper system in the correct shape and position for mounting the spacer frame on a glass panel.

9. The method according to claim 1, wherein the gripper system is rotated relative to the robot arm in order to hold and to guide a hollow-section strip in the station for producing spacer frames, and/or to turn spacer frames in the station for coating spacer frames, and/or to orient spacer frames in the station for assembling insulating glass into the glass panel, on which the spacer frame is to be mounted.

10. The method according to claim 1, wherein the single robot carries the gripper system with various functions on robot arms.

11. The method according to claim 7, wherein the gripper system comprises a flange plate on which the clamps are arranged.

12. The method of claim 1, further comprising a step performed by the single robot, prior to the coating step, of moving the spacer frame to a station for filling spacer frames with hygroscopic material.

13. The method of claim 3, wherein the single robot comprises at least two articulated robot arms.

14. The method of claim 13, wherein the at least two robot arms are capable of articulating in multiple ways.

15. The method according to claim 2, wherein the single robot has a base that is designed to travel, and wherein the single robot moves to stations of a manufacturing line for insulating glass and/or to one of multiple manufacturing lines for insulating glass.

16. The method according to claim 3, wherein the single robot has a base that is designed to travel, and wherein the single robot moves to stations of a manufacturing line for insulating glass and/or to one of multiple manufacturing lines for insulating glass.

17. The method according to claim 2, wherein the single robot grasps spacer frames using the gripper system, which is arranged on the at least one robot arm of the single robot, and moves to stations and/or manufacturing lines.

18. The method according to claim 3, wherein the single robot grasps spacer frames using the gripper system, which is arranged on the at least one robot arm of the single robot, and moves to stations and/or manufacturing lines.

19. The method according to claim 4, wherein the single robot grasps spacer frames using the gripper system, which is arranged on the at least one robot arm of the single robot, and moves to stations and/or manufacturing lines.

* * * * *